Feb. 3, 1942.   F. W. PYE   2,271,830
BELT DRIVE TRANSMISSION MEANS
Filed Feb. 8, 1940
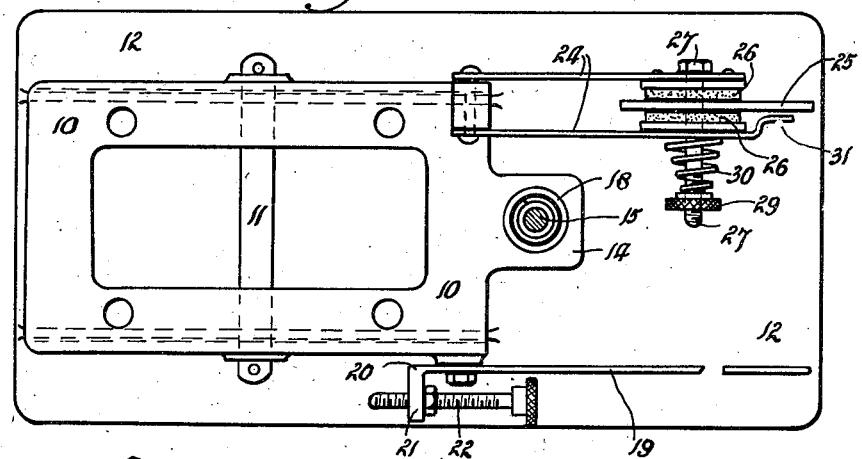
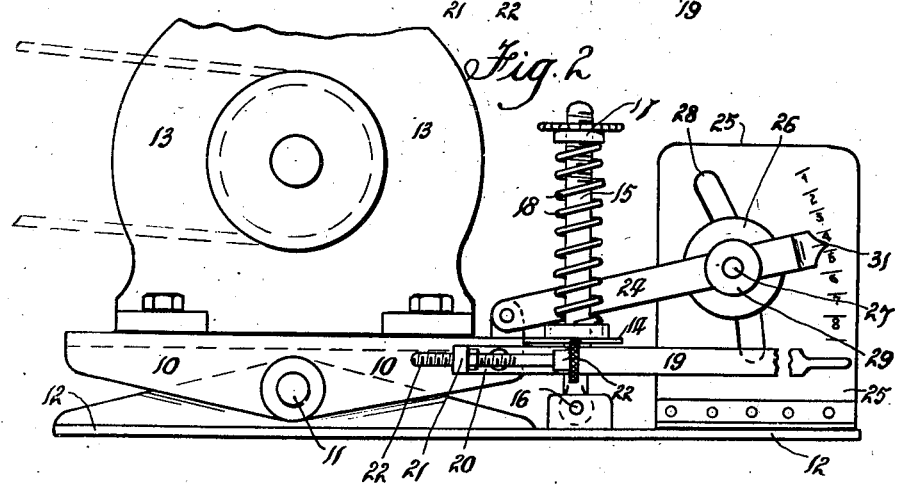
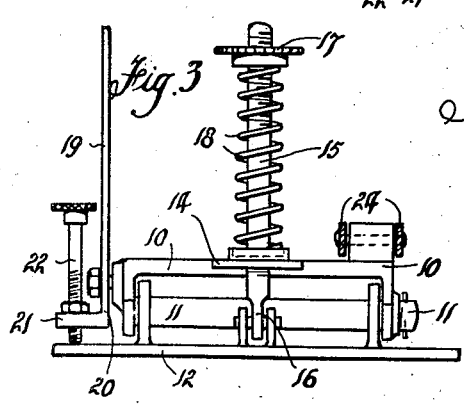
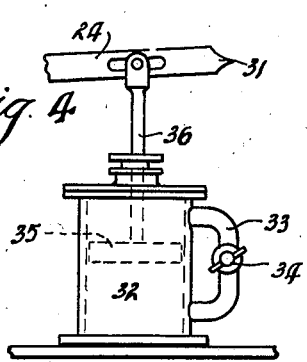
INVENTOR
FRANCIS WILLIAM PYE.
BY Young, Emery & Thompson
ATTYS.

Patented Feb. 3, 1942

2,271,830

UNITED STATES PATENT OFFICE 2,271,830

BELT DRIVE TRANSMISSION MEANS

Francis William Pye, Auckland, New Zealand

Application February 8, 1940, Serial No. 318,008
In New Zealand February 10, 1939

4 Claims. (Cl. 248—23)

This invention has reference to means for use in mounting a prime mover, more particularly an electric motor, so that the belt drive transmission therefrom may be automatically controlled to tension it and maintain its tension during operation.

More especially, the invention has reference to that known class of means used for the mounting of an electric motor in which the motor is secured upon a hinged or pivoted platform and acts by its weight to effect the belt tension in a manner that will allow of a certain give and take in the fluctuations of driving power incidental to the nature of the motor and also to the variations in loading torque as the drive is taken up.

The object of the present invention is to provide improvements in means of the abovementioned nature by the employment of which the said platform is so controlled in its functioning that the taking up of the drive load is controlled and such control is capable of variation, the motor may be started under free load conditions and may be instantly released from its load if so required, and correct and variable regulation of the belt tension may be effected and such regulation, if so desired, made in relation to a gauge indicator combined with the device. In addition, the means for controlling and governing the platform are of such a nature that they act as a vibration damper and absorber of driving shocks. Other advantages attached to the use of these improvements will hereinafter appear.

The invention comprises the combination with a platform pivotally supported upon a base plate at about midway in the length of the platform, of spring cushion means connecting one end of the platform to the base plate to normally restrain such end from rising, and of means whereby the tipping movements of the platform in both directions upon its pivots may be braked. The invention also comprises means for combination with the pivoted platform and its base plate whereby such platform at its spring cushioned end may be lifted and retained in the raised position against the action of the spring cushion, and may be freed. Thus with an electric motor or other prime mover mounted on the platform and transmitting its drive by driving belt extending from the reverse end of the platform than the spring cushioned end, the automatic and manual controls of the tension of such belt are obtainable.

In fully describing the invention, however, reference will be made to the accompanying drawing, in which:

Figure 1 is a plan of the apparatus, part being in section.

Figure 2 is a front side elevation thereof, and showing a motor in position upon the platform.

Figure 3 is a back end elevation thereof, part being in section.

Figure 4 is a view of alternative braking or checking means for the tipping platform.

In this invention the platform 10 to which the motor is fastened is mounted on a transverse axis 11 at about its middle, and supported upon a suitable base plate 12. The means for fastening the motor are of such a nature that the motor shown at 13 in Figure 2 may be adjusted along the platform length to regulate the balancing of the two ends. From the end of the platform reverse from that from which the drive of the motor is transmitted (for convenience hereinafter referred to as the back end) an extension 14 projects and up through this extension passes a vertical rod 15, the lower end of which is articulated at 16 to the base plate 12, while its upper end is screw threaded and receives a thumb nut 17 screwed thereon. A helical spring 18 is provided to surround this rod 15 and to extend between the nut 17 and the platform extension 14. The regulation of the pressure force of this spring upon the back end of the platform, by means of the nut, will regulate the extent to which the platform is to be overbalanced at its back end to apply the driving tension to the transmission belt of the motor mounted on the platform, while it will also provide for a spring cushion to absorb the shocks incidental to the said transmission.

In this invention, also, a lever handle 19 is pivoted to the back end of the platform 10 so that it may turn in a vertical plane lengthwise with the platform side, and such lever is provided with a downward extension 20 beneath the platform which is adapted when the lever is raised to the vertical, as in Figure 3, to engage with its end the surface of the base plate 12 and serve to lift the back end of the platform and thus cause the motor transmission belt to be slackened, and when turned towards the horizontal, as in Figures 1 and 2, to allow the back end of the platform to be lowered by the aforesaid pressure of the spring 18, and thereby tension the belt to take up the drive. This said extension 20 is preferably so made that the amount of lift to be given the back end of the platform may be varied. This may suitably be effected by forming the extension with a lug 21 and passing a screw stud 22 down through the lug in the plane of the lever length, the lower end of which screw is rounded, or otherwise made, to cause it to engage the base plate in its platform lifting operations with a minimum of frictional resistance.

In order to check or dampen the operations of the spring 18 to force the back end of the platform down, when the platform 10 is released by the operation of the said lever 19, and thus to cause the motor drive to be taken up at a controlled rate through the controlled tensioning of the belt, and also in order to impose a check upon shocks in the drive causing the platform to be lifted at its back end, such platform has suitable frictional or hydraulic, or pneumatic resistances combined with it and with the platform supporting base.

These resistance, or damping means may suitably comprise a pair of parallel spring arms 24 arranged to extend in parallel lines out from the back end of the platform 10 and to pass on the respective faces of a plate 25 fixed to extend vertically from the base plate 12 so that in the up and down movements of the platform, the arms 24 move up and down across the plate. Combined with these arms, and fitted one on each side of the plate, are friction discs 26 engaging the plate faces and held in position by means of a screw pin 27 passing through both arms, both discs, and through a curved slot 28 formed in the plate. This pin has a tightening nut 29 and cushion spring 30 associated therewith and by means of which the friction discs may be caused to engage with any desired pressure upon the plate surfaces and thus to act as a brake or damper in controlling the rate at which the back end of the platform is forced down by its spring control and also the rate at which it will lift against such control. One of the said arms 24 may have its end formed as a pointer 31 and the face of the plate 25 over which it passes may be marked with gauge indications, as shown in Figure 2, over which the pointer travels in its movements. These markings may be used to give an indication to the user in adjusting the compression of the spring 18 controlling the platform 10 to cause it to force the platform down to a defined extent as determined by the tension desired in the driving belt.

Other damping means, as a hydraulic or pneumatic dash pot apparatus such as that shown in Figure 4, may be used to obtain these effects, the time control being suitably provided for.

Such dash pot apparatus may suitably consist in a cylinder 32 fixed vertically upon the base plate 12 and having closed ends connected by a pipe 33 in which a valve 34 is fitted. A plunger 35 is arranged within the cylinder and from its upper side a plunger rod 36 extends out of the cylinder top, which rod is articulated to the arm 24. Or the cylinder may be arranged under either end of the platform so that the plunger rod is connected to the platform end, while the cylinder engages the base plate. The cylinder is filled with any desired fluid which is capable of displacement from one side of the plunger to the other through the pipe 33 and at a rate governed by the valve 34. Thus the platform may be checked in its tipping movements.

The apparatus therefore provides for the motor 13 being allowed to run free of its load, for its load being imposed upon it until full load is taken up at a regulatable rate, and also for the load being regulated in its degree. After the spring 18 has been adjusted and the damper action regulated, the taking up of the full load from the running motor is effected automatically.

I claim:

1. An apparatus of the character described, comprising a base plate, a platform designed to support a prime mover, which platform is pivotally mounted at about midway in its length upon such base plate by transversely extending pivotal means, regulatable spring pressure means acting on one end of the platform to keep such end down, means for lifting one end of the platform and for keeping it raised, consisting in a lever pivoted to the platform so that it may turn in a vertical plane and having an extension beyond the pivot, and a screw pin screwed through such extension in the line of the lever's length.

2. An apparatus of the character described, comprising a base plate, a platform designed to support a prime mover, which platform is pivotally mounted at about midway in its length upon such base plate by transversely extending pivotal means, regulatable spring pressure means acting on one end of the platform to keep such end down, lifting means combined with the platform and base plate and adapted to raise the end of the platform on which the downward spring pressure is acting and to retain such end in a raised position, means for braking or damping the tipping movements of the said platform consisting in a flat plate fixed to extend vertically from the said base plate, a pair of spring arms fastened to the platform to pass across the respective faces of the said flat plate, a friction disc fastened to each arm to engage the surface of the flat plate, and means whereby the discs may be caused to engage the plate surfaces with a regulatable pressure.

3. An apparatus of the character described, comprising a base plate, a platform designed to support a prime mover, which platform is pivotally mounted at about midway in its length upon such base plate by transversely extending pivotal means, regulatable spring pressure means acting on one end of the platform to keep such end down, lifting means combined with the platform and base plate and adapted to raise the end of the platform on which the downward spring pressure is acting and to retain such end in a raised position, means for braking or damping the tipping movements of the said platform consisting in a flat plate fixed to extend vertically from the said base plate and provided with a curved slot therein, a pair of spring arms fastened to the platform to pass across the respective faces of the said flat plate, a friction disc fastened to each arm to engage the surface of the flat plate, a pin passing through both spring arms, both friction discs and the said curved slot, formed with a head on one end and provided with a nut screwed upon its other end, and a compression spring surrounding the pin between the said nut and the adjacent spring arm.

4. An apparatus of the character described, comprising a base plate, a platform designed to support a prime mover, which platform is pivotally mounted at about midway in its length upon such base plate by transversely extending pivotal means, regulatable spring pressure means acting on one end of the platform to keep such end down, means for lifting one end of the platform and for keeping it raised, consisting in a lever pivoted to the platform so that it may turn in a vertical plane and having an extension beyond the pivot, a screw pin screwed through such extension in the line of the lever's length, and means for damping or braking the tipping movements of said platform consisting in a fluid-controlled dash-pot disposed between one end of the platform and said base plate.

FRANCIS WILLIAM PYE.